US009435358B2

(12) United States Patent
Remmelmann et al.

(10) Patent No.: US 9,435,358 B2
(45) Date of Patent: Sep. 6, 2016

(54) HYDRAULIC DIRECTIONAL CONTROL VALVE

(71) Applicant: Deere & Company, Moline, IL (US)

(72) Inventors: Andreas Remmelmann, Karlstein (DE); Christian Brueser, Speyer (DE)

(73) Assignee: DEERE & COMPANY, Moline, IL (US)

( * ) Notice: Subject to any disclaimer, the term of this patent is extended or adjusted under 35 U.S.C. 154(b) by 57 days.

(21) Appl. No.: 14/507,398

(22) Filed: Oct. 6, 2014

(65) Prior Publication Data

US 2015/0096632 A1 Apr. 9, 2015

(30) Foreign Application Priority Data

Oct. 8, 2013 (DE) ........................ 10 2013 220 279

(51) Int. Cl.
*F16K 31/524* (2006.01)
*F15B 13/04* (2006.01)
*F15B 13/044* (2006.01)

(52) U.S. Cl.
CPC ......... *F15B 13/0402* (2013.01); *F15B 13/044* (2013.01); *F15B 2211/32* (2013.01); *F15B 2211/322* (2013.01); *Y10T 137/87217* (2015.04)

(58) Field of Classification Search
CPC .. F15B 11/08; F15B 13/0402; F15B 13/044; F15B 2211/322; F15B 2211/32; Y10T 137/87217; Y10T 137/6103; Y10T 137/6106; Y10T 137/7747; Y10T 137/87378
USPC .............. 137/596.17, 315.39, 315.4, 614.05; 251/251, 164, 264, 324
See application file for complete search history.

(56) References Cited

U.S. PATENT DOCUMENTS 2,342,770 A * 2/1944 Temple .................... F15B 13/04 137/596.2
3,403,700 A * 10/1968 Meynell ................ F16K 11/166 137/607
3,596,679 A * 8/1971 Sugden, Jr. ......... F15B 13/0402 137/595
4,273,029 A * 6/1981 Sheppard ............... B62D 5/087 137/625.69
4,337,688 A * 7/1982 Sheppard ................. B62D 5/24 137/625.69
4,362,018 A * 12/1982 Torii ................... F15B 11/0445 60/468
4,616,674 A * 10/1986 Bardoll ................. F15B 13/042 137/596.16
4,643,225 A * 2/1987 Imhof ................. F15B 13/0402 137/596.17
4,674,539 A * 6/1987 Sloate ................... F15B 13/043 137/625.6
4,754,693 A * 7/1988 Teltscher ............ F15B 13/0405 137/596.18
4,951,712 A * 8/1990 Becker .................. F16K 11/163 137/596.17
5,058,484 A * 10/1991 Kuttruf ................... F15B 21/08 137/636.1
5,085,245 A * 2/1992 Grove ................... F16K 11/027 137/315.11
5,094,260 A * 3/1992 Stuart .................. G05D 16/202 137/102
5,183,069 A * 2/1993 Berg ................... B29C 45/2806 137/15.18

(Continued)

*Primary Examiner* — Craig Schneider
*Assistant Examiner* — Minh Le

(57) ABSTRACT

A hydraulic directional control valve for activating a hydraulic load, comprising a housing with a pump connection for connecting to a pressure source, a tank connection for connecting to a hydraulic fluid reservoir and a first and second working connection for connecting to the hydraulic load, and a first and a second valve slide, which are held in the housing so as to be linearly movable in a displacement direction.

3 Claims, 2 Drawing Sheets

(56) References Cited

U.S. PATENT DOCUMENTS

| | | | | | |
|---|---|---|---|---|---|
| 5,263,513 | A * | 11/1993 | Roe | F15B 13/0405 | 137/596.15 |
| 5,713,686 | A * | 2/1998 | Maughan | F16B 7/06 | 403/274 |
| 7,308,848 | B2 * | 12/2007 | Jacobsen | F15B 13/04 | 91/433 |
| 7,861,741 | B2 * | 1/2011 | Kress | E02F 9/2221 | 137/556.3 |
| 7,926,512 | B2 * | 4/2011 | Spickard | F02C 7/232 | 137/625.64 |
| 8,051,764 | B2 * | 11/2011 | Jacobsen | F15B 11/16 | 91/519 |
| 2002/0178902 | A1 * | 12/2002 | Trzmiel | F15B 13/0402 | 91/459 |
| 2015/0114496 | A1 * | 4/2015 | Tadano | F16K 7/06 | 137/596.17 |
| 2015/0300379 | A1 * | 10/2015 | Kubota | F15B 15/18 | 60/459 |

* cited by examiner

HYDRAULIC DIRECTIONAL CONTROL VALVE

FIELD

The present disclosure relates to a hydraulic directional control valve for controlling a hydraulic load.

BACKGROUND

Hydraulic directional control valves with a one-part valve slide have a rigid arrangement of the control edges relative to one another. The pump connection, the tank connection and the working connections are activated via the control edges. The valve slide is displaced by a suitable actuator relative to a housing of the directional control valve. The arrangement of the control edges is generally designed with regard to a defined field of use for the directional control valve. While a standard arrangement can be suitable for a wide field of use, the use of a directional control valve for controlling a front loader of an agricultural implement, for example, requires a specially adapted arrangement of the control edges in order to avoid cavitation in the hydraulic circuit of the front loader. In that sense, a directional control valve with the standard arrangement of control edges cannot be readily used for controlling a front loader, for example. There would have to be a laborious replacement of the valve slide.

For the purpose of increased variability with respect to the field of use for the directional control valve, multipart valve slides are used in place of the single-part slide. This procedure is referred to as the concept of autonomous control edges. Every valve slide is displaced via an actuator relative to the housing of the directional control valve. The displacement movements of the multiple valve slides relative to one another are coordinated based on software via a high-performance control unit, wherein determining the position of the valve slides relative to the housing or relative to one another must be assured via an elaborate sensing process.

SUMMARY

According to an aspect of the present disclosure, a directional control valve is provided which has autonomous control edges with relatively simple control technology.

The hydraulic directional control valve for controlling a hydraulic load includes a housing with a pump connection for connecting to a pressure supply, a tank connection for connecting to a hydraulic fluid reservoir and a first and second working connection for connecting to the hydraulic load, and a first and second valve slide, which are held in the housing so as to be linearly movable in a displacement direction in order to open the pump connection, the tank connection and a working connection via control edges arranged on the valve slides, and an actuating member operatively interconnected to the first and second valve slides in order to act on the valve slides in the displacement direction relative to the housing.

It is assumed according to the invention that the mutual operative connection between the first actuating member and the first valve slide on the one hand and the first actuating member and the second valve slide on the other is a mechanical connection and not a virtually existing connection. Because of this connection, the disadvantages of the previously described software-based coordination of the displacement paths of the multiple valve slides by means of a control unit, including sensing, can be avoided. In particular, the directional control valve according to the invention can be configured with a simple control technology and robustly implemented. The hydraulic load may be a double-acting hydraulic cylinder of a front loader, for example. The opening of the pump connection, the tank connection and the working connections via the control edges on the valve slides, which are held linearly movable, can also be referred to as activation.

The term activating in this case implies an opening generated by an appropriately opposing movement of one or both valve slides.

The first valve slide preferably comprises two first control edges for activating the first working connection, and the second valve slide comprises two control edges for activating the second working connection. Thereby independent opening and closing characteristics in the inlet channel and the return channel can be adjusted.

In a first embodiment of the directional control valve according to the invention, the actuating member has a control cam arrangement for impinging on the valve slides. A cam arrangement represents an easy possibility for transmitting a control movement.

The valve slides are preferably movable jointly relative to the housing, and the position of the valve slides relative to one another in the displacement direction of the valve slides is adjustable by means of the control cam arrangement. This advantageously not only makes it possible to implement the activation of the connections by means of the control cam arrangement, but also allows a coordination of the control edges of the first valve slide relative to the control edges of the second valve slide, referred to as trimming.

This control cam arrangement preferably has a first and a second cam, which respectively act on the first and second valve slide. Due to the two cam contours, it is possible to apply a specific adjusting characteristic for trimming to each of the two valve slides, independently of the respective other valve slide.

The first and second cam contours are preferably pivotable about a control axis arranged perpendicular to the displacement direction. Thereby a rotational movement of the cam contour can be translated exactly and in a simple manner into a translatory movement of the valve slides.

A relative pivot angle of the first and second cam contours about the control axis is preferably adjustable. In this way, the control edges of the two valve slides can advantageously be precisely trimmed relative to one another.

In a second embodiment of the directional control valve according to the invention, the first and second valve slides have threaded sections that can be brought into mutual engagement, and the actuating member effects a displacement of at least one of the valve slide in the displacement direction by rotating at least one of the valve slides relative to the other valve slide. A sensitive trimming can advantageously be realized by connecting the two valve slides. The threaded connection is preferably self-locking.

In this second embodiment, the actuating member preferably forms a spindle drive with at least one of the valve slides. A spindle drive constitutes a robust possibility for mechanical adjustment of the two valve slides relative to one another.

In the second embodiment, the first and second valve slides are preferably movable relative to the housing by means of a second actuating member.

DETAILED DESCRIPTION OF THE DRAWINGS

Figure 1:
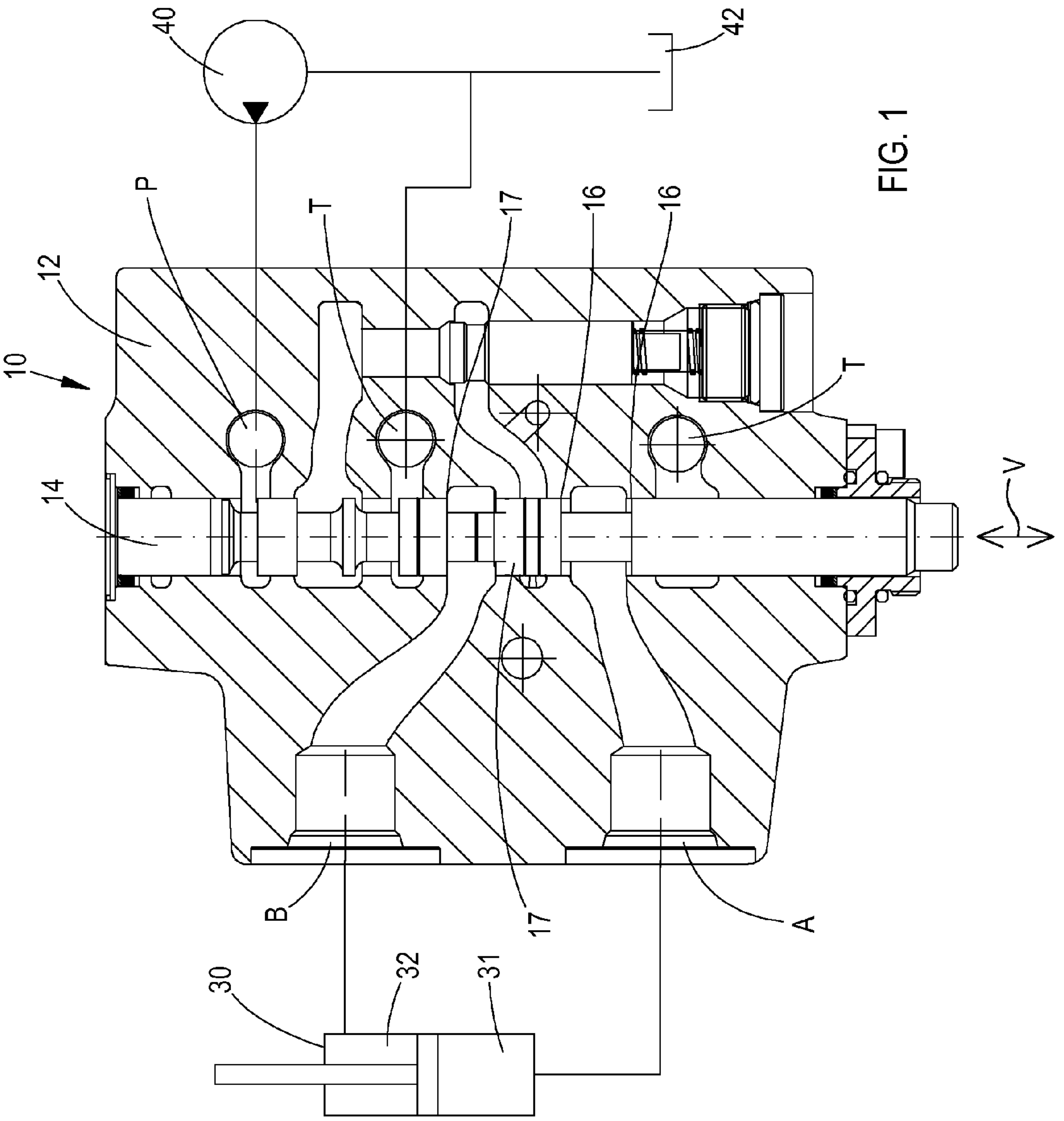
FIG. 1 is a schematic diagram of a circuit with a hydraulic directional control valve according to the prior art.

Referring to FIG. 1, a circuit arrangement includes a hydraulic directional control valve 10 according to the prior art, and a hydraulic cylinder 30 operatively connected hydraulically to the directional control valve 10. The hydraulic cylinder 30 may be, for example, a component of a lifting mechanism for an agricultural vehicle, not shown.

By applying pressure to the piston bottom-side cylinder chamber 31 or to the annular flange-side cylinder chamber 32, the lifting mechanism is lowered or correspondingly raised. The piston bottom-side cylinder chamber 31 is connected to a first working connection A of the directional control valve 10, and the annular flange-side cylinder chamber 32 is connected to a second working connection B of the directional control valve.

The hydraulic cylinder 30 is driven by a hydraulic pump 40, which delivers hydraulic fluid from a reservoir 42 and, under pressure, to the hydraulic cylinder 30 via the directional control valve 10. The hydraulic pump 40 is connected to a pump connection P of the directional control valve 10. A tank connection T of the directional control valve 10 is connected to the reservoir 42.

The directional control valve 10 comprises a housing 12 and a valve slide 14 held movable linearly in a displacement direction V in the housing. Via control means that are not shown, the valve slide is held relative to the housing 12 in a first switching position, which functions as a neutral position. In the first switching position, the pump connection P, the tank connection T and the first and second working connections A, B are blocked. By means of an actuating member, not shown in FIG. 1, the valve slide 14 can be moved relative to the housing 12 into a second, a third and a fourth switching position. In the second switching position, which functions as a retracted position, the pump connection P is connected to the second working connection B, and the first working connection A is connected to the tank connection. In the second switching position, which functions as a retracted position, the pump connection P is connected to the second working connection B, and the first working connection A is connected to the tank connection T. In the third switching position, which functions as an extension position, the pump connection P is connected to the first working connection A, and the second working connection B is connected to the tank connection T. In the fourth switching position, which functions as a floating position, the pump connection P is closed and the first working connection A, the second working connection B and the tank connection T are connected to one another.

The valve slide 14 has a number of radially directed and circumferential cutbacks, which are used in relation to the pump connection P, the tank connection T and the two working connections A, B in the housing 12 as control edges 16, 16, 17, 17 to control the flow of the hydraulic fluid. As a consequence of the arrangement of the control edges on the one valve slide 14, the association of the control edges to one another is defined invariably. To that extent, the connections P, T, A, B are activated upon displacement of the valve slide 14 between the switching positions according to a fixed characteristic.

Figure 2:
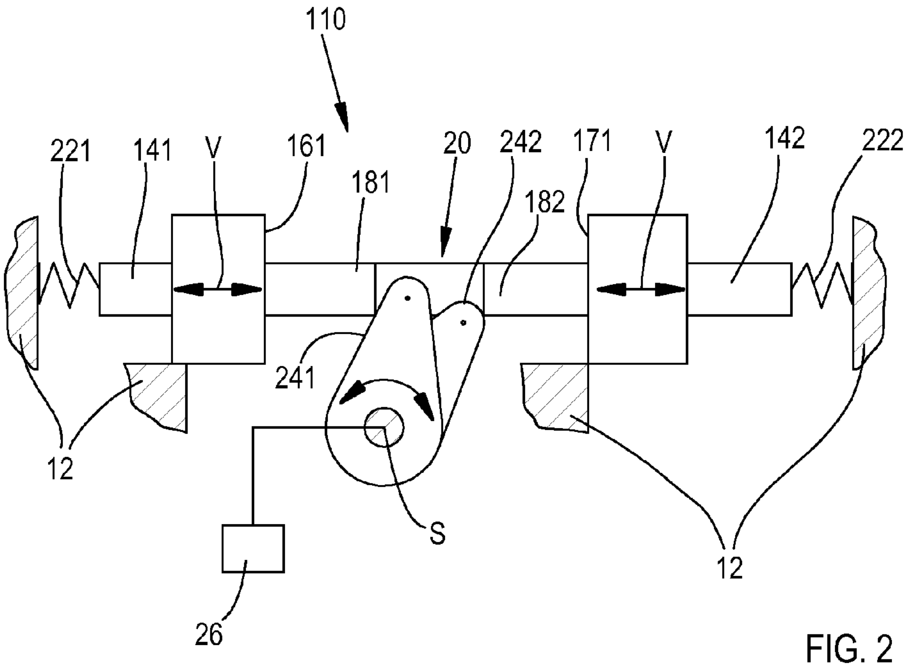
FIG. 2 is a schematic diagram of a hydraulic directional control valve according to a first embodiment of the invention.

FIG. 2 shows a schematic representation of a hydraulic directional control valve 110 according to a first embodiment of the invention. In the following description, only the differences relative to the prior art shown in FIG. 1 are described. Areas of the housing 12 and two valve slides 141, 142 retained movably relative to the housing in the displacement direction V can be recognized. A first control edge 161, 171 for each valve slide 141, 142 is shown. The two valve slides 141, 142 are arranged parallel to one another.

In addition, the two valve slides 141, 142 can be arranged aligned with one another. A control cam arrangement 20 is provided between mutually facing ends 181, 182 of the valve slides 141, 142. The control cam arrangement 20 acts simultaneously on both ends 181, 182 of the valve slides 141, 142 against spring means 221, 222, via which the valve slides 141, 142 are supported in relation to the housing 12. The spring means 221, 222 in turn press the two valve slides 141, 142 into the neutral position.

The control cam arrangement 20 is designed in such a manner that is capable of displacing the valve slides 141, 142 in relation to the displacement direction V both in opposite directions and in the same direction. For this purpose, the control arrangement 20 first comprises an actuating member 26 by means of which the control cam arrangement 20 can be pivoted about a control axis S arranged perpendicular to the displacement direction V. By pivoting the control cam arrangement 20 about the control axis S, the two valve slides 141, 142 can be displaced simultaneously with one another in the displacement direction V relative to the housing 12, in order to realize an activation thereby. Upon activation, the control cam arrangement 20 accordingly presses the two valve slides 141, 142 into a position differing from the neutral position.

The control cam arrangement 20 can additionally comprise a first cam contour 241 and a second cam contour 242, wherein the first cam contour 241 acts upon the end 181 of the first valve slide 141 and the second cam contour 242 acts upon the end 182 of the second valve slide 142. In this way, the first cam contour 241 and the second cam contour 242 can be pivoted by means of the actuating member 26 relative to one another or independently of one another about the pivot axis S. By means of the pivoting of the two cam contours 241, 242 relative to one another, the two valve slides 141, 142 can be displaced relative to one another and independently of one another in the displacement direction V relative to the housing 12, in order thereby to realize a trimming.

Figure 3:
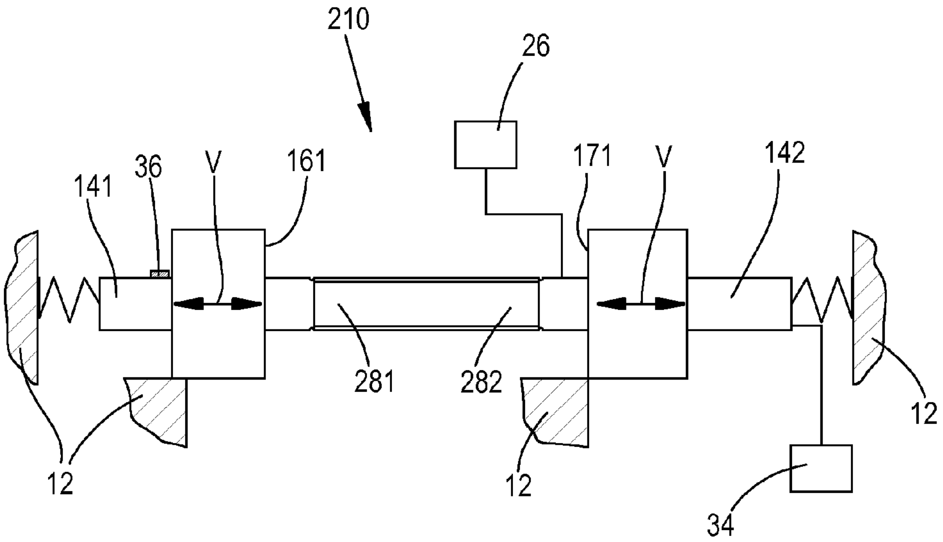
FIG. 3 is a schematic diagram of a hydraulic directional control valve according to a second embodiment of the invention.

FIG. 3 shows a schematic representation of a hydraulic directional control valve 210 according to a second embodiment of the invention. Only the differences relative to the first embodiment, which was presented in FIG. 2, will be described below.

The two valve slides 141, 142 have threaded sections 281, 282 that can be brought into mutual engagement. In this case, one of the threaded sections 281, 282 is constructed as a section with an inside thread, and the other of the threaded sections 281, 282 is constructed with an outside thread matching the inside thread. By mutually rotating the two valve slides 141, 142 when threaded sections 281, 282 are engaged with one another, the position of the two valve slides 141, 142 relative to one another in the displacement direction V changes, and thus the distance of the control edge 161 of the first valve slide 141 from the control edge 171 of the second valve slide 142 is changed. In a specific configuration, it can be provided in this respect that one of the two valve slides 141, 142 is secured by suitable locking means 36 against rotation relative to the housing about the axis of rotation described by the displacement direction V. To rotate the two valve slides 141, 142 relative to one another, the actuating member 26 can be operatively connected to the valve slide 141, 142 not secured against rotation relative to the housing 12 in such a manner that the actuating member rotates this valve slide 141, 142 relative to the housing 12 and the other valve slide 141, 142. The operating connection can be realized in that the actuating member 26 forms a spindle drive together with the corresponding valve slide 141, 142.

In the second embodiment, a second actuating member 34 is provided, with which the two valve slides 141, 142 can be displaced relative to the housing 12 in the displacement direction V simultaneously with one another, in order thereby to realize an activation.

The actuating member 26 may include a piezoelectric element (not shown). A piezoelectric element has the advantage of working wear-free.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A hydraulic directional control valve for activating a hydraulic load, comprising:

a housing having a pump connection for connecting to a pressure source, a tank connection for connecting to a hydraulic reservoir, and a first and a second working connection for connecting to the hydraulic load;

a first and a second valve slide, slidably received by the housing, the valve slides being movable linearly in a displacement direction in the housing in order to activate the pump connection, the tank connection and the working connection via control edges arranged on the valve slides; and an actuating member operatively connected with the first and the second valve slides in order to press the valve slide in the displacement direction relative to the housing, the actuating member having a control cam arrangement for acting upon the valve slides;

wherein the control cam arrangement has a first and a second cam contour acting respectively on the first and the second valve slide, the first and the second cam contours displaceable about a control axis arranged perpendicular to the displacement direction; and wherein a relative pivot angle of the first and second cam contours relative to one another about the control axis is adjustable.

2. The hydraulic directional control valve of claim 1, wherein:

the first valve slide comprises two first control edges for activating the first working connection, and the second valve slide comprises two second control edges for activating the second working connection.

3. The hydraulic directional control valve of claim 1, wherein:

the valve slides are jointly displaceable by the control cam arrangement relative to the housing, and the position of the valve slides relative to one another in the displacement direction is adjustable.

* * * * *